United States Patent [19]

Bobb et al.

[11] Patent Number: 5,639,968
[45] Date of Patent: Jun. 17, 1997

[54] OPTICAL FIBER STRAIN-TO-FAILURE SENSOR

[75] Inventors: Lloyd C. Bobb, Horsham; Howard D. Krumboltz, Chalfont, both of Pa.

[73] Assignee: The United States of America as represented by the Secretary of the Navy, Washington, D.C.

[21] Appl. No.: 546,974

[22] Filed: Oct. 23, 1995

[51] Int. Cl.$^6$ ............................................. G02B 6/02
[52] U.S. Cl. ................................... 73/800; 73/760
[58] Field of Search .................. 73/800, 760; 385/28

[56] References Cited

U.S. PATENT DOCUMENTS

| | | | |
|---|---|---|---|
| 4,475,812 | 10/1984 | Buczek et al. | 73/800 |
| 4,636,638 | 1/1987 | Huang et al. | 250/231 |
| 4,761,073 | 8/1988 | Meltz et al. | 356/32 |
| 4,836,030 | 6/1989 | Martin | 73/800 |
| 5,222,165 | 6/1993 | Bohlinger | 73/800 |
| 5,461,926 | 10/1995 | Bobb et al. | 73/800 |
| 5,461,927 | 10/1995 | Bobb et al. | 73/800 |

FOREIGN PATENT DOCUMENTS 1485009  6/1989  U.S.S.R. ................. 73/800

OTHER PUBLICATIONS

W.G. Mullen and W.L. Dolch "Periscope–Type Strain Gauge Measures Creep in Immersed Specimens" Materials Research & Standards, Apr. 1966.

Primary Examiner—Richard Chilcot
Assistant Examiner—Max H. Noori
Attorney, Agent, or Firm—Susan E. Verona; Ron Billi

[57] ABSTRACT

A sensor and method are disclosed for determining if a region, defined by two end points, in a structure has exceeded a predetermined amount of strain. The sensor has an optical waveguide which has two ends for receiving and emitting light and which is fixable at two locations thereon to respective ones of the end points to define a sensing region therebetween. The sensing region has a first portion with a first length and a first cross-sectional area, and a second portion with a second length and a second cross-sectional area which is smaller than the first cross-sectional area. The lengths and cross-sectional areas are sized so that the optical waveguide has a strain failure point equal to the predetermined amount of strain. The lengths and cross-sectional areas are approximately sized according to the formula $R=\alpha+1/(\alpha/\beta+1)$, wherein R=the ratio of the amount of strain in the second portion which will cause the optical waveguide to fail to the predetermined amount of strain in the structure, $\alpha$=the ratio of the length of the first portion to the length of the second portion, and $\beta$=the ratio of the cross-sectional area of the first portion to the cross-sectional area of the second portion.

14 Claims, 1 Drawing Sheet

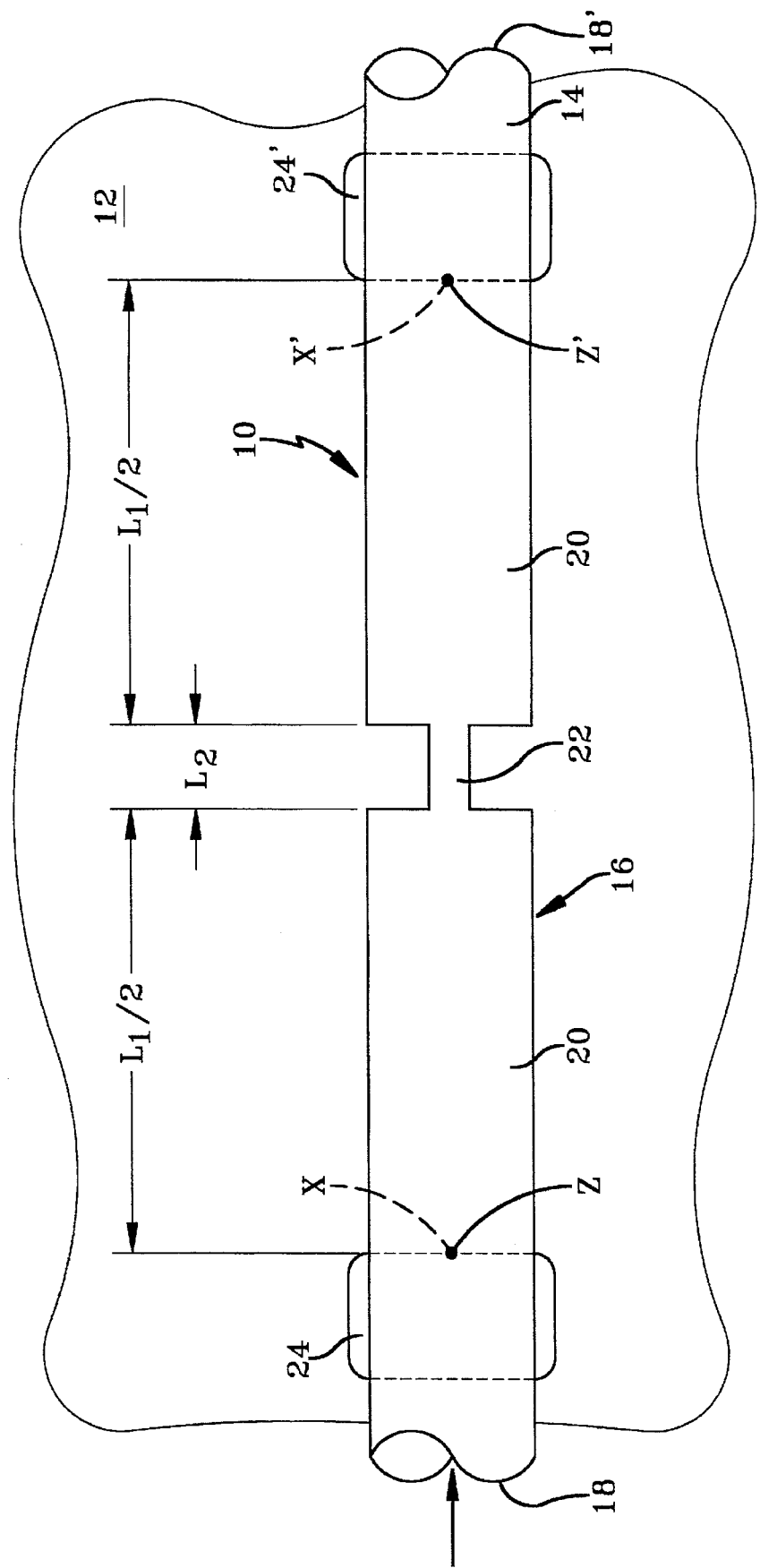

OPTICAL FIBER STRAIN-TO-FAILURE SENSOR

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to a strain sensor and more particularly to an optical fiber strain-to-failure sensor which can measure small amounts of strain.

Oftentimes it is desirable to determine whether a structure has exceeded some maximum strain value during a given time frame, as a means of providing a warning of failure of the structure. For example, it may be desirable to know if some component in an aircraft has exceeded some predetermined strain value during a flight.

Optical fiber strain sensors exist which rely on failure of the optical fiber at the location of strain to indicate the presence of the strain. In such a sensor, the fiber is attached to the structure so that when the structure experiences strain the fiber experiences the same amount of strain. When the structure has reached an amount of strain that is the same as the fiber's maximum strain capacity, the fiber fails. The failure of the fiber is detected when light is launched into one end of the fiber and not detected at the other end. Such sensors have the advantage that they are lightweight and do not take up much space. Furthermore, they can be embedded in structures like laminated composites. One problem with sensors of this type is that the amount of strain which will cause the fiber in such a sensor to fail is variable, making it difficult to predetermine the maximum strain to an accurate degree. Additionally, the amount of strain required to break the fiber is too large to be of interest in many applications. Most optical fibers will not fail until they have reached a strain level in the range of 20,000 to 30,000 microstrain, yet structures may fail at strain levels as low as 2000 to 3000 microstrain.

SUMMARY OF THE INVENTION

It is therefore an object of the present invention to provide an optical fiber strain sensor for detecting that a region in a structure has exceeded a predetermined small amount of strain.

It is another object of the present invention to provide a strain sensor for detecting a small amount of strain, which sensor is lightweight and capable of being embedded within a structure.

It is still another object of the present invention to provide a method of determining if a region in a structure has exceeded a predetermined amount of strain.

These and other objects are accomplished by a sensor and method for determining if a region, defined by two end points, in a structure has exceeded a predetermined amount of strain. The sensor has an optical waveguide which has two ends for receiving and emitting light and which is fixable at two locations thereon to respective ones of the end points to define a sensing region therebetween. The sensing region has a first portion with a first length and a first cross-sectional area, and a second portion with a second length and a second cross-sectional area which is smaller than the first cross-sectional area. The lengths and cross-sectional areas are sized so that the optical waveguide has a strain-to-failure point equal to the predetermined amount of strain. The lengths and cross-sectional areas are approximately sized according to the formula $R=\alpha+1/(\alpha/\beta+1)$, wherein $R$=the ratio of the amount of strain in the second portion which will cause the optical waveguide to fail to the predetermined amount of strain in the structure, $\alpha$=the ratio of the length of the first portion to the length of the second portion, and $\beta$=the ratio of the cross-sectional area of the first portion to the cross-sectional area of the second portion.

The method includes first providing an optical waveguide capable of transmitting light therethrough and having two ends for receiving and emitting light therethrough, and having a known strain-to-failure point. Two locations on the optical waveguide are selected whereupon the waveguide will be fixed to respective ones of the two end points on the structure. These two locations define a sensing region of the optical waveguide therebetween. The sensing region of the optical waveguide is provided with a first portion having a first length and a first cross-sectional area, and a second portion having a second length and a second cross-sectional area which is smaller than that of the first portion, the lengths and cross-sectional areas being sized so that when the optical waveguide is fixed to the structure at the two end points thereon the strain in the optical waveguide will reach the known strain-to-failure point of the optical waveguide when the structure reaches the predetermined strain. The locations on the optical waveguide are fixed to the two end points on the structure so that the optical waveguide will be pulled in tension as the strain in the region increases the distance between the two end points. One then observes whether or not the optical waveguide has failed, as an indication as to whether the region in the structure has exceeded the predetermined amount of strain.

Other objects, advantages, and novel features of the invention will become apparent from the following detailed description of the invention when considered in conjunction with the accompanying drawing.

BRIEF DESCRIPTION OF THE DRAWINGS

The FIGURE is a diagrammatic view of an optical fiber strain-to-failure sensor according to the invention.

DESCRIPTION OF THE PREFERRED EMBODIMENT

Referring now to the drawing, one sees an optical fiber strain-to-failure sensor 10 according to the invention positioned to detect when the strain in a structure 12 in a region thereon defined by two end points X and X' has exceeded a predetermined amount. Strain sensor 10 has an optical waveguide 14, such as a multimode optical fiber capable of transmitting light therethrough, which is fixed to end points X and X' at two locations Z and Z', respectively, on the outer surface thereof. The distance between locations Z and Z' defines a sensing region 16 of sensor 10. Optical waveguide 14 extends beyond locations Z and Z' and has two ends 18 and 18' which can receive and emit light therethrough. Strain in structure 12 causes strain in waveguide 14, which fails when the strain in the structure reaches the predetermined maximum value $\epsilon_s$. Failure of waveguide 14 is determined by launching light into one end 18 of the waveguide and observing that it does not emerge from the other end 18'.

Waveguide 14 fails when structure 12 reaches the predetermined maximum value $\epsilon_s$ because sensing region 16 has two portions, distinguished by particular lengths and cross-sectional areas. A first portion 20 has a first length $L_1$ and a first cross-sectional area $A_1$, and a second portion 22 has a second length $L_2$ and a second cross-sectional area $A_2$ which is smaller than the cross-sectional area $A_1$ of first portion 20. Portions 20 and 22 may be broken into discontinuous segments, separated by segments of the other portion. For instance, as shown in the FIGURE, first portion 20 may be broken into two segments of equal length $L_1/2$, with second portion 22 being between the two segments of the first portion.

$L_1$, $L_2$, $A_1$, and $A_2$ are approximately sized according to the formula $R=\alpha+1/(\alpha/\beta+1)$, wherein:

$\alpha=L_1/L_2$;

$\alpha=A_1/A_2$; and $R=\epsilon_2/\epsilon_s$, wherein:

$\epsilon_s$=the predetermined amount of strain in the structure; and $\epsilon_2$=the amount of strain in the second portion which will cause the optical waveguide to fail.

The value of strain that will cause the optical waveguide to fail, $\epsilon_2$, can be determined experimentally, and is the same at any point along the length of the waveguide, regardless of the cross-sectional area at that point.

To size the lengths and cross-sectional areas, first the desired maximum strain in the structure, $\epsilon_s$, which is to be detected must be determined. Then the amount of strain which will cause waveguide 14 to break (in second portion 22), $\epsilon_2$, must be determined. The ratio of these two values, R, is plugged into the above equation to determine the other values as indicated. For example, if it is determined that waveguide 14 will fail in second portion 22 when the strain therein is ten times the predetermined amount of maximum desirable strain in the structure, then $L_1$ could be ten times $L_2$, and $A_1$ could be one hundred times $A_2$. In this situation, when structure 12 experiences strain, second portion 22 experiences ten times that amount of strain, and when the structure reaches the predetermined amount of maximum desirable strain, second portion 22 will fail.

For convenience, the cross-sectional area $A_1$ of first portion 20 should typically be the same as that of a standard optical waveguide. In other words, whatever optical waveguide is used in sensor 10, the cross-sectional area thereof is used as the cross-sectional area $A_1$ of first portion 20. Second portion 22 may then be formed by reducing the cross-sectional area of waveguide 14 where second portion 22 is to be. This reduction may be accomplished by chemical etching, plasma etching, or ion milling. The cross-sectional area can also be reduced by heating waveguide 14 along a length thereof which is smaller than the eventual length of second portion 22 while applying tension thereto. The minimum size of $A_2$ is limited by the ability of the waveguide to transmit light therethrough. As long as light can still pass through second portion 22, $A_2$ is not too small. Of course, if it is desirable that $A_1$ be less than the cross-sectional area of the waveguide provided, it can be reduced by etching or ion milling as well.

Waveguide 14 is attached to structure 12 at respective points and locations by any adhesive 24 and 24' which will adhere to both the waveguide and the structure, and which will not change much dimensionally when cured. An example of an appropriate adhesive is UV-cured epoxy. Sensing region 16 of waveguide 14 should preferably be pretensioned and attached to structure 12 so that any strain experienced by the structure is also experienced by the sensing region. Alternatively, sensing region 16 can have a known amount of slack therein, increasing the amount of strain structure 12 can experience before breaking waveguide 14. The equation should be adjusted accordingly.

Some of the many features and advantages of the present invention should now be readily apparent. For instance, an optical fiber strain-to-failure sensor has been provided for detecting that a region in a structure has exceeded a predetermined small amount of strain. The sensor is lightweight and capable of being embedded within a structure. Furthermore, a method of determining if a region in a structure has exceeded a predetermined small amount of strain has been provided.

Other embodiments and modifications of the present invention may readily come to those of ordinary skill in the art having the benefit of the teachings of the foregoing description. Therefore, it is to be understood that the present invention is not to be limited to the teachings presented and that such further embodiments and modifications are intended to be included in the scope of the appended claims.

What is claimed is:

1. A sensor for determining if a region, defined by two end points, in a structure has exceeded a predetermined amount of strain along the line through the two end points, comprising:

an optical waveguide having two ends for receiving and emitting light, fixable at two locations along the length thereof to respective ones of the end points to define a sensing region therebetween, the locations on said optical waveguide being fixed to the two end points on the structure so that said optical waveguide will be pulled in tension as the strain in the region increases the distance between the two end points, the sensing region having a first portion with a first length and a first cross-sectional area, and a second portion with a second length and a second cross-sectional area which is smaller than the first cross-sectional area, said lengths and cross-sectional areas being sized so that said sensing region of said optical waveguide has a strain failure point equal to the predetermined amount of strain.

2. The sensor according to claim 1, wherein said first portion comprises two segments and said second portion is between said two segments of said first portion.

3. The sensor according to claim 2, wherein said two segments of said first portion are of equal length.

4. The sensor according to claim 1, wherein said lengths and cross-sectional areas are approximately sized according to the formula $R=\alpha+1/(\alpha/\beta+1)$, wherein R=the ratio of the amount of strain in the second portion which will cause said optical waveguide to fail to the predetermined amount of strain in the structure, $\alpha$=the ratio of the length of the first portion to the length of the second portion, and $\beta$=the ratio of the cross-sectional area of the first portion to the cross-sectional area of the second portion.

5. A method of determining if a region, defined by two end points, in a structure has exceeded a predetermined amount of strain, comprising the steps of:

providing an optical waveguide capable of transmitting light therethrough and having two ends for receiving and emitting light therethrough;

selecting two locations on the optical waveguide whereupon the waveguide will be fixed to respective ones of the two end points on the structure, which two locations define a sensing region of the optical waveguide therebetween;

providing the sensing region of the optical waveguide with a first portion having a first length and a first cross-sectional area, and a second portion having a second length and a second cross-sectional area which is smaller than that of the first portion, the lengths and cross-sectional areas being sized so that when the optical waveguide is fixed to the structure at the two end points thereon the strain in the optical waveguide will reach the known strain failure point of the second portion of the optical waveguide when the structure reaches the predetermined strain; and fixing the locations on the optical waveguide to the two end points on the structure so that the optical waveguide will be pulled in tension as the strain in the region increases the distance between the two end points.

6. The method according to claim 5, further including the step of observing whether or not the optical waveguide has failed, as an indication as to whether the region in the structure has exceeded the predetermined amount of strain.

7. The method of claim 6, wherein said step of observing whether or not the optical waveguide has failed includes the step of launching light into one end of the waveguide and observing that it does not emerge from the other end thereof.

8. The method according to claim 5, wherein the lengths and cross-sectional areas are approximately sized according to the formula $R=\alpha+1/(\alpha/\beta+1)$, wherein R=the ratio of the known strain failure point of the second portion of the optical waveguide to the predetermined amount of strain in the structure, $\alpha$=the ratio of the length of the first portion to the length of the second portion, and $\beta$=the ratio of the cross-sectional area of the first portion to the cross-sectional area of the second portion.

9. The method of claim 5, wherein said step of fixing the locations on the optical waveguide to the two end points on the structure further includes the step of pretensioning the optical waveguide so that it is taut when fixed to the structure.

10. The method of claim 5, wherein said step of fixing the locations on the optical waveguide to the two end points on the structure further includes the step of applying a UV-cured epoxy between locations and their respective end points.

11. The method of claim 5, wherein said step of providing the sensing region of the optical waveguide with a first portion having a first length and a first cross-sectional area, and a second portion having a second length and a second cross-sectional area which is smaller than that of the first portion includes the step of reducing the cross-sectional area of the provided optical waveguide in the area thereof which is the second portion.

12. The method of claim 11, wherein said step of reducing the cross-sectional area of the provided optical waveguide in the area thereof which is the second portion includes the step of etching away the outer surface of the optical waveguide until the desired cross-sectional area of the second portion is achieved.

13. The method of claim 12, wherein said step of etching includes chemical etching.

14. The method of claim 12, wherein said step of etching includes plasma etching.

* * * * *